United States Patent [19]
Rehmer et al.

[11] Patent Number: 4,879,361
[45] Date of Patent: Nov. 7, 1989

[54] PREPARATION OF BEAD POLYMERS FROM WATER-SOLUBLE, ETHYLENICALLY UNSATURATED MONOMERS

[75] Inventors: Gerd Rehmer, Bobenheim-Boxheim; Manfred Niessner, Ludwigshafen; Wilfried Heide, Freinsheim; Heinrich Hartmann, Limburgerhof; Karl-Clemens Peters, Bad Durkheim, all of Fed. Rep. of Germany

[73] Assignee: BASF Aktiengesellschaft, Ludwigshafen, Fed. Rep. of Germany

[21] Appl. No.: 168,825

[22] Filed: Mar. 16, 1988

[30] Foreign Application Priority Data

Mar. 26, 1987 [DE] Fed. Rep. of Germany ....... 3709921

[51] Int. Cl.$^4$ ................................................ C08F 2/00
[52] U.S. Cl. ..................................... 526/201; 526/213
[58] Field of Search ................................ 526/201, 213

[56] References Cited

U.S. PATENT DOCUMENTS 3,218,302  11/1965  Melamid ............................. 526/201
4,164,613   8/1979  Hoene et al. ........................ 526/201
4,647,636   3/1987  Makita et al. .

FOREIGN PATENT DOCUMENTS

1040309-A  12/1986  Japan ................................... 526/201

Primary Examiner—Joseph L. Schofer
Assistant Examiner—Alex H. Walker
Attorney, Agent, or Firm—Bill C. Panagos

[57] ABSTRACT

Polymers in bead form are prepared from water-soluble ethylenically unsaturated monomers by a reverse suspension polymerization of a liquid in the presence of polymerization initiators and protective colloids obtainable by grafting polymers (A) containing (a) aromatic monovinyl monome from 40 to 100% by weight (b) $C_{3-6}$ monoethylenically unsaturated carboxylic acid and/or maleic anhydride from 0 to 60% by weight (c) other monoethylenically unsaturated monomers from 0–20% by weight, as copolymerized units with the proviso that the sum of the weight (a) to (c) is always 100 and the polymer (A) has a molecular weight (number average) from 500 to 20,000 and a hydrogenation iodine number from 1.3 to 51 with a fixed monomer mixture at given concentration levels.

5 Claims, No Drawings

PREPARATION OF BEAD POLYMERS FROM WATER-SOLUBLE, ETHYLENICALLY UNSATURATED MONOMERS

The process of reverse suspension polymerization, where an aqueous solution of water-soluble, ethylenically unsaturated monomers is suspended in an inert hydrophobic liquid and polymerized therein to polymeric products in bead form in the presence of a polymerization initiator and a protective colloid, is known; cf. U.S. Pat. No. 2,982,749. Said prior art also discloses various kinds of protective colloids which stabilize water-in-oil emulsions and affect the size of the polymer beads. U.S. Pat. No. 4,189,559 discloses that, to prepare polymers of water-soluble, ethylenically unsaturated monomers by the method of reverse suspension polymerization, it is possible to use as the protective colloid reaction products which are obtainable for example by reacting oils and/or resins having allyl hydrogen atoms with maleic anhydride. Such protective colloids are of importance in particular for preparing polyacrylamide and copolymers of acrylamide and acrylic acid. U.S. Pat. No. 4,164,613 discloses using as protective colloid in the reverse suspension polymerization polymers which are obtainable by thermal or free radical solution or bulk polymerization of from 60 to 99.9% by weight of dicyclopentadiene, from 0 to 30% by weight of styrene and from 0.1 to 10% by weight of maleic anhydride. The disadvantage of existing protective colloids is that they give good results only for a limited number of water-soluble ethylenically unsaturated monomers. It has to be regarded as a further disadvantage of existing protective colloids that they give products having a very broad particle size distribution.

It is an object of the present invention to provide a process for preparing bead polymers of water-soluble, ethylenically unsaturated monomers by reverse suspension polymerization of a suspension of an aqueous solution of the monomers in an inert hydrophobic liquid in the presence of polymerization initiators and protective colloids, which gives bead polymers having a narrow particle size distribution and in which the formation of coatings on the stirrer and on the inner surface of the polymerization apparatus virtually no longer occurs. The protective colloids sought here shall ideally be colorless and odorless and stabilize the aqueous suspension even during long polymerization times.

We have found that this object is achieved with a process for preparing a polymer in bead form from water-soluble, ethylenically unsaturated monomers by reverse suspension polymerization of a suspension of an aqueous solution of the monomers in an inert hydrophobic liquid in the presence of a polymerization initiator and a protective colloid by using as the protective colloid a graft polymer obtainable by grafting a polymer (A) containing (a) from 40 to 100% by weight of an aromatic monovinyl monomer,
(b) from 0 to 60% by weight of a monoethylenically unsaturated carboxylic acid of to 6 carbon atoms, maleic anhydride and/or itaconic anhydride and
(c) from 0 to 20% by weight of other monoethylenically unsaturated monomers, as copolymerized units with the proviso that the sum of the weight percentages (a) to (c) is always 100 and the polymer (A) has a molecular weight (number average) from 500 to 20,000 and a hydrogenation iodine number from 1.3 to 51 with a monomer mixture of (1) from 70 to 100% by weight acrylic ester and/or methacrylic ester of a monohydric alcohol containing from 1 to 20 carbon atoms,
(2) from 0 to 15% by weight of a monoethylenically unsaturated carboxylic acid of 3 to 6 carbon atoms, maleic anhydride and/or itaconic anhydride,
(3) from 0 to 10% by weight of an acrylic monoester and/or methacrylic monoester of a not less than 2-hydric alcohol,
(4) from 0 to 15% by weight of an aromatic monovinyl monomer and
(5) from 0 to 7.5% by weight of acrylamide and/or methacrylamide with the proviso that the sum of the weight percentages (1) to (5) is always 100, at up to 150° C. in an inert hydrophobic diluent in the presence of a polymerization initiator, the monomers being used in an amount from 97.5 to 50% by weight based on the mixture of polymer (A) and monomers.

Throughout the entire specification and claims, the hydrogenation iodine number has been determined using German Standard Specification DIN 53,241. When using German Standard Specification DIN 53,241, it is important to note that the hydrogenation iodine number must be determined at least twice in order to be certain that the hydrogenation iodine number is accurate.

The hydrogenation iodine number is understood to mean that quantity of iodine which is equivalent to that quantity of hydrogen which is added to 100 grams of a sample under a condition of either a constant atmospheric pressure or a changing atmosphere pressure.

The hydrogenation iodine number in grams of iodine per 100 grams of sample with a constant atmospheric pressure during the hydrogenation is calculated from the following formula:

$$\frac{(V_o - V_{oBl})\, 0.01132}{m} \cdot 100 \tag{1}$$

wherein $$V_o = \frac{V(p - p_L)}{(1 + at)\, 1013} \tag{2}$$

$$V = V_A - V_E \tag{3}$$

Equations (2) and (3) are also valid for calculating the blank value of the solvent $V_{oBl}$. In the above formulas,
a denotes the coefficient of expansion of hydrogen (0.0036608 $t^{-1}$)

$$\frac{(V_o - V_{oBl})\, 0.01132}{m} \, 100 \tag{4}$$

$$V_o = V_{AO} - V_{EO} \tag{5}$$

$$V_{AO} = \frac{V_A(p_A - p_L)}{(1 + at)\, 1013} \tag{6}$$

$$V_{EO} = \frac{V_E(p_E - p_L)}{(1 + at)\, 1013} \tag{7}$$

Equations (5) to (7) are also valid for calculating the solvent blank value $V_{oBl}$. In formulas 4, 5, 6 and 7,
a, m, $p_L$, t, $V_o$, $V_{oBl}$, as defined above
$p_A$ denotes the atmospheric pressure in mbar at the beginning of the hydrogenation $p_E$ denotes the atmospheric pressure in mbar at the end of the hydrogenation $V'_A$ denotes the total volume of hydrogen in ml at the beginning of the hydrogenation determined from the volume of the hydrogenation apparatus (less the volume m demotes the sample weight in grams p denotes the atmospheric pressure in mbar $p_L$ denotes the saturation vapor pressure of the solvent in mbar at the working temperature t t denotes the working temperature on °C.

V denotes the volume of hydrogen absorbed in ml in the main experiment $V_A$ denotes the volume of hydrogen, in ml, in the gas burette read off at the beginning of the hydrogenation $V_E$ denotes the volume of hydrogen, in ml, in the gas burette read off at the end of the hydrogenation $V_o$ denotes the volume of hydrogen, in ml, absorbed in the main experiment after conversion to normal conditions $V_{oB1}$ denotes the volume of hydrogen, in ml, absorbed in the determination of the solvent blank value as specified in subclause 9 after conversion to normal conditions.

If the atmospheric pressure changes during hydrogenation, it is essential to allow for the volume of the hydrogenation apparatus determined up to the burette scale less the volume of solvent and magnetic stirring rod.

The hydrogenation iodine number of a sample under a change in atmospheric pressure during the hydrogenation is calculated from the following formula: of solvent and magnetic stirring rod) and the gas volume read off in the hydrogen burette.

$V'_{AO}$ denotes the total volume of hydrogen in ml at the beginning of the hydrogenation, converted to normal conditions, $V'_E$ denotes the total volume of hydrogen in ml at the end of the hydrogenation determined from the volume of the hydrogenation apparatus (less the volume of solvent and magnetic stirring rod) and the gas volume read off in the hydrogen burette $V'_{EO}$ denotes the total volume of the hydrogen in ml at the end of the hydrogenation after conversion to normal conditions.

All the water-soluble ethylenically unsaturated monomers can be polymerized by the method of reverse suspension polymerization. These monomers comprise for example ethylenically unsaturated $C_3$–$C_6$-carboxylic acids, such as acrylic acid, methacrylic acid, itaconic acid, maleic acid, fumaric acid and ethacrylic acid, and also the amides thereof, in particular acrylamide and methacrylamide, and substituted amides thereof, such as N-methylolacrylamide, N-methylolmethacrylamide, N-alkoxymethylacrylamide and N-alkoxymethyl(meth)acrylamide. Therein the alkoxy group has from 1 to 4 carbon atoms. Further suitable water-soluble ethylenically unsaturated monomers are Di-$C_1$-$C_3$-alkylamino-$C_2$-$C_6$-alkyl (meth)acrylates, such as dimethylaminoethyl acrylate, dimethylaminoethyl methacrylate, diethylaminoethyl acrylate, diethylaminoethyl methacrylate, dimethylaminopropyl acrylate, dimethylaminobutyl acrylate, dimethylaminoneopentyl acrylate and dimethylaminoneopentyl methacrylate. The basic acrylates can be subjected to the polymerization in the form of the salts with inorganic acids or carboxylic acids of 1 to 4 carbon atoms or even in quaternized form. Also suitable are olefinically unsaturated nitriles, such as acrylonitrile.

Also suitable are water-soluble diallylammonium compounds of the general formulae

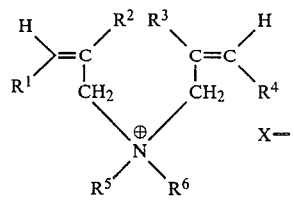

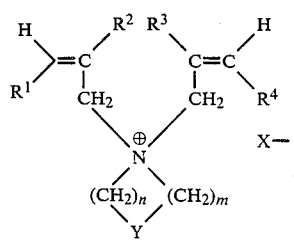

where $X^-$ is a halide ion, such as chloride, fluoride, bromide or iodide, or a hydroxyl, nitrate, methosulfate, hydrogensulfate or dihydrogenphosphate ion, n and m are each 1 or 2, preferably both are 2, Y is >N-methyl, >N-ethyl, preferably oxygen or a >$CH_2$ group, and $R^1$, $R^2$, $R^3$ and $R^4$ are each hydrogen or alkyl of 1 to 6 carbon atoms and $R^5$ and $R^6$ are each H or alkyl which may be straight-chain or branched and has from 1 to 18 carbon atoms, preferably from 1 to 6 carbon atoms, or aryl and/or benzyl.

Such diolefinically unsaturated monomers are for example dimethyldiallylammonium chloride, dimethyldiallylammonium bromide, diethyldiallylammonium chloride, methyl-tert.-butyldiallylammonium methosulfate, methyl-n-propyldiallylammonium chloride, dimethyldiallylammonium hydrogensulfate, dimethyldiallylammonium dihydrogenphosphate, di-n-butyldiallylammonium bromide, diallylpiperidinium bromide, diallylpyrrolidinium chloride and diallylmorpholinium bromide.

Also suitable are N-vinylpyrrolidones, such as N-vinylpyrrolidone. Suitable water-soluble monomers also include N-vinylformamide. It is copolymerized either alone or in mixture with N-vinylpyrrolidone, acrylamide and/or methacrylamide in any desired ratio.

Water-soluble monomers can also be N-vinylimidazolium compounds which can be characterized for example in terms of the following formula:

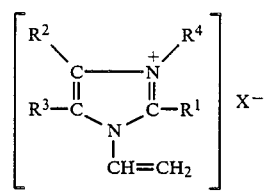

where $R^{1'}$, $R^2$ and $R^3$ are each H or $CH_3$ and $R^1$ can also be $C_2H_5$, $C_3H_7$ or $C_4H_9$, and $R^4$ is H, $C_1$-$C_6$-alkyl, benzyl or

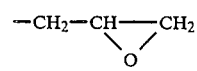

and $X^-$ is an anion, such as $Cl^-$, $Br^-$, $I^-$, methosulfate, ethosulfate, acetatesulfate, hydrogensulfate or dihydrogenphosphate. From this class of compounds, preference is given to using unsubstituted N-vinylimidazole in salt form. Further suitable water-soluble monomers are N-vinylimidazoline which can be characterized for example in terms of the following general formula:

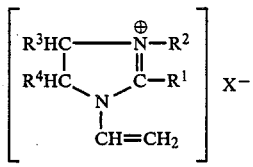
(I)

where $R^1$ is H, $C_1$–$C_{18}$-alkyl or

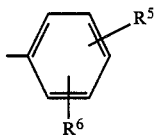

$R^5$ and $R^6$ are each H, $C_1$–$C_4$-alkyl or Cl, $R^2$ is H, $C_1$–$C_{18}$-alkyl,

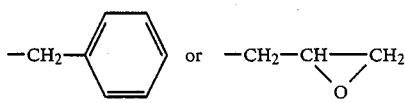

$R^3$ and $R^4$ are each H or $C_1$–$C_4$-alkyl, and
$X^-$ is an acid radical.

The preferred choice from this group of compounds polymerization is a 1-vinyl-2-imidazoline salt of the formula II

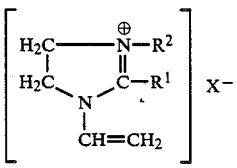
(II)

where $R^1$ is H, $CH_3$, $C_2H_5$, n- or i-$C_3H_7$ or $C_6H_5$ and $X^-$ is an acid radical. $X^-$ is preferably $Cl^-$, $Br^-$, $SO_4{}^{2-}$, $HSO_4\ominus$, $H_2PO_4\ominus$, $CH_3$—O—$SO_3^-$, $C_2H_5$—O—$SO_3^-$ or $R^1$—$COO^-$ and $R^2$ is H, $C_1$–$C_4$-alkyl or aryl.

The substituent $X^-$ in the formulae I and II can basically be any desired acid radical of an inorganic or organic acid. The monomers of the formula I are obtained by neutralizing the free base, ie. a 1-vinyl-2-imidazoline, with an equivalent amount of an acid. The vinylimidazoline can also be neutralized for example with trichloroacetic acid, benzenesulfonic acid or toluenesulfonic acid. Aside from salts of 1-vinyl-2-imidazolines it is also possible to use quaternized 1-vinyl-2-imidazolines. They are prepared by reacting 1-vinyl-2-imidazolines which may be substituted in the 2-, 4- and 5-position, with known quaternizing agents. Suitable quaternizing agents are for example $C_1$–$C_{18}$-alkyl chlorides or bromides, benzyl chloride, benzyl bromide, epichlorohydrin, dimethyl sulfate and diethyl sulfate.

Preferred quaternizing agents are epichlorohydrin, benzyl chloride, dimethyl sulfate and methyl chloride.

Further suitable water-soluble monomers are for example acrylamidomethylpropanesulfonic acid, vinylsulfonic acid, vinylphosphonic acid and vinyllactic acid. Preferred water-soluble ethylenically unsaturated monomers are diallyldimethylammonium chloride, acrylic acid, methacrylic acid, N-vinylpyrrolidone, acrylamide and methacrylamide. The monomers can be polymerized either alone into homopolymers or mixed with each other into copolymers in bead form. Of particular interest are for example copolymers of acrylamide and acrylic acid, copolymers of acrylamide and methacrylic acid, copolymers of methacrylamide and acrylic acid, copolymers of methacrylamide and methacrylic acid, copolymers of acrylamide, acrylic acid and acrylamido-2-methylpropanesulfonic acid, copolymers of acrylamide and dimethylaminoethyl acrylate, copolymers of acrylamide and diethylaminoethyl methacrylate, and copolymers of methacrylamide and dimethylaminoethyl acrylate. The carboxylic acids and other ethylenically unsaturated acids, such as vinylsulfonic acid and acrylamidopropanesulfonic acid, can be used in the polymerization either in the form of the free acid, in partially neutralized form or even in completely neutralized form. Suitable bases for neutralizing these monomers are for example sodium hydroxide solution, potassium hydroxide solution, ammonia and amines, such as triethylamine, butylamine, morpholine and ethanolamine.

The basic acrylates and methacrylates are preferably used in the homopolymerization or copolymerization in the form of a salt or in quaternized form. The basic acrylates and methacrylates are neutralized for example by means of hydrochloric acid, hydrobromic acid, sulfuric acid, phosphoric acid and carboxylic acids, such as formic acid, acetic acid and propionic acid. In addition, the basic acrylates and methacrylates are used in quaternized form. The quaternization products are obtained by quaternizing these compounds with customary quaternizing agents, such as methyl chloride, ethyl chloride, benzyl chloride, lauroyl chloride, dimethyl sulfate, diethyl sulfate or epichlorohydrin.

The polymerization of the water-soluble monomers can also be carried out in the presence of crosslinkers. Crosslinkers contain two or more ethylenically unsaturated double bonds. Suitable crosslinkers are for example N,N'-methylene bisacrylamide, polyethylene glycol diacrylates and polyethylene glycol dimethacrylates which each derive from polyethylene glycols having a molecular weight from 126 to 8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, diesters or triesters of acrylic or methacrylic acid with adducts between ethylene oxide and/or propylene oxide and trimethylolpropane, diesters or triesters of acrylic or methacrylic acid with polyhydric alcohols, such as glycerol or pentaerythritol, triallylamine, tetraallylethylenediamine, divinylbenzene, diallyl phthalate, polyethylene gylcol divinyl ether, trimethylolpropane diallyl ether, butanediol divinyl ether, pentaerythritol triallyl ether and/or divinylethylene urea and/or triallylmonoalkylammonium salts, for example triallylmethylammonium chloride. Preference is given to using water-soluble crosslinkers, for example N,N'-methylene bisacrylamide, polyethylene glycol diacrylates, polyethylene glycol dimethacrylates, pentaerythritol triallyl ether and/or divinylurea. The crosslinkers are used in an amount from 0.001 to 5, preferably from 0.01 to 2, % by weight, based on the monomer mixture used in the reverse suspension polymerization.

To polymerize the monomers, they are first dissolved in water. The concentration of monomer in the aqueous solution is from 15 to 80, preferably from 35 to 65% by weight. The aqueous solution is then dispersed in an inert hydrophobic liquid to form a suspension. Suitable inert hydrophobic liquids are virtually all water-immiscible liquids which are inactive in the polymerization. Preference is given to using for this purpose aliphatic and aromatic hydrocarbons or mixtures thereof. Suitable aliphatic hydrocarbons are for example pentane, hexane, heptane, octane, nonane, decane, cyclohexane, decalin, methylcyclohexane, isooctane and ethylcyclohexane. Aromatic hydrocarbons for use as hydrophobic liquids in the reverse suspension polymerization are for example benzene, toluene, xylene and isopropylbenzene. In addition it is of course also possible to use halogen-ated hydrocarbons, such as tetrachloroethane, hexachloroethane, trichloroethane and chlorobenzene. Preference is given to using cyclohexane or hydrocarbons having a boiling range from 60° to 120° C.

The reverse suspension polymerization is carried out in the presence of polymerization initiators. Suitable for this purpose are the customary free radical initiators, such as peroxides, hydroperoxides and azo compounds. Preference is given to using water-soluble polymerization initiators, such as sodium persulfate, potassium persulfate, ammonium persulfate, 2,2'-azobis(2-amidinopropane) dihydrochloride, 2,2'-azobis(N,N'-dimethyleneisobutyramidine) dihydrochloride and 4,4'-azobis(4-cyanopentanoic acid).

The reverse suspension polymerization is carried out by suspending an aqueous solution of one or more water-soluble monomers in an inert hydrophobic liquid so as to form a water-in-oil suspension. To stabilize this suspension, a suitable protective colloid is required. According to the invention, the protective colloid used comprises a graft polymer obtainable by grafting a polymer (A) containing (a) from 40 to 100% by weight of an aromatic monovinyl monomer,
(b) from 0 to 60% by weight of a monoethylenically unsaturated carboxylic acid of 3 to 6 carbon atoms, maleic anhydride and/or itaconic anhydride and
(c) from 0 to 20% by weight of other monoethylenically unsaturated monomers, as copolymerized units with the proviso that the sum of weight percentages a) to c) is always 100, with the monomers specified above under (1) to (5). The polymer (A) can be either a homopolymer of an aromatic monovinyl monomer, such as styrene, or a copolymer of an aromatic monovinyl monomer with an ethylenically unsaturated carboxylic acid or an anhydride of a monoethylenically unsaturated carboxylic acid.

Suitable components (a) for polymers (A) are aromatic monovinyl monomers, for example styrene, α-methylstyrene, α-alkylstyrenes having 2 to 6 carbon atoms in the alkyl, which may be straight-chain and/or branched, for example α-iso-butylstyrene. Also suitable are aromatic vinyl compounds which, in addition to the vinyl group, carry a $C_1$-$C_8$-alkyl on the aromatic nucleus, for example vinyltoluene, tert-butylstyrene, halostyrenes, ring(alkyl)-substituted α-alkyl-styrenes having 1 to 8 carbon atoms in the ring alkyl radical and having 1 to 6 carbon atoms in the α-alkyl radical, for example para-tert-butyl-α-methylstyrene. The preferred monomer from this group of monomers is styrene. Styrene accounts for 40 to 100% by weight, preferably from 60 to 95% by weight, of the substance of polymer (A).

The monomers of group (b) include monoethylenically unsaturated carboxylic acids of 3 to 6 carbon atoms and/or anhydrides thereof, for example acrylic acid, methacrylic acid, ethacrylic acid, maleic acid, fumaric acid, itaconic acid, maleic anhydride, itaconic anhydride, vinyllactic acid, vinylphosphonic acid and vinylsulfonic acid. These monomers are used either alone or mixed. In this group of monomers, preference is given to acrylic acid, methacrylic acid, maleic anhydride and itaconic anhydride. The monomers of this group account for from 0 to 60, preferably from 5 to 40, % by weight of the substance of polymer (A).

In addition to the monomers of groups (a) and (b), optionally up to 20% by weight of other monoethylenically unsaturated monomers may be present in polymer (A) in polymerized form. This group of monomers includes for example the esters of acrylic acid, methacrylic acid and/or ethacrylic acid which are derived from alcohols of 1 to 12 carbon atoms, for example methyl acrylate, methyl methacrylate, tert-butylcyclohexyl acrylate, tert-butylcyclohexyl methacrylate, cyclohexyl acrylate, cyclohexyl methacrylate, tert-butyl acrylate, tert-butyl methacrylate, n-butyl acrylate, n-butyl methacrylate, isobutyl acrylate, isobutyl methacrylate, 2-ethylhexyl acrylate, 2-ethylhexyl methacrylate and vinyl esters of saturated aliphatic carboxylic acids containing 2 to 10 carbon atoms, for example vinyl acetate, vinyl propionate, vinyl laurate, vinyl butyrate and vinyl stearate. Another group of monomers are the amides of methacrylic acid, acrylic acid and ethacrylic acid. They can comprise for example methacrylamide or acrylamide and also N-substituted amides, such as N-tert-butylmethacrylamide or N-tert-butylacrylamide. A further class of monomers which may or may not form part of the substance of polymer (A) are acrylonitrile and methacrylonitrile. The monomers of group (c) can be present alone or mixed in amounts of up to 20% by weight in copolymer (A) as copolymerized units. The sum of the percentages (a), (b) and (c) is always 100.

The polymers A) have a molecular weight (number average) from 500 to 20,000 and hydrogenation iodine numbers from 1.3 to 51, preferably from 2.5 to 25.4. It is particularly preferred to use polymers (A) whose hydrogenation iodine numbers are from 5.1 to 16.9. The average molecular weight (number average) of the polymers (A) is preferably from 1,000 to 10,000. Preference is given to using these polymers (A) which are sparingly soluble in aliphatic hydrocarbons having a boiling point range from 50° to 150° C.

Polymers of this type are known. They are prepared for example by homopolymerization or copolymerization of the monomers (a) to (c) at from 180° to 400° C., preferably at from 200° to 300° C., in bulk in the absence of a solvent. Particular preference is given to the continuous bulk polymerization of the monomers carried out within the stated temperature range, in particular at from 200° to 260° C., and pressures from 1 to 100, preferably from 20 to 50, bar in the absence of polymerization initiators or alternatively, in the presence of polymerization initiators and polymerization inhibitors.

Such polymerization processes are known for example from the following references: German Laid-Open Application Nos. DOS 3,026,831 and 3,046,476, U.S. Pat. Nos. 4,042,768 and 4,414,370 (incorporated herein by reference).

The polymers (A) are used as a graft base for preparing the protective colloids to be used according to the invention. To prepare the graft polymers, generally a portion of the polymerization initiator and a portion of the mixture of monomers (1) to (5) is heated to an elevated temperature in a solution or dispersion of the polymer (A) in an aliphatic and/or aromatic hydrocarbon, preferably in the solvent which is subsequently used as the hydrophobic inert liquid in the reverse suspension polymerization, and the remaining portions of monomer and polymerization initiator are added after the polymerization has started.

The monomers of group (1) are acrylic esters and/or methacrylic esters of monohydric alcohols containing from 1 to 20 carbon atoms. Examples of this group of monomers are methyl acrylate, methyl methacrylate, ethyl acrylate, ethyl methacrylate, propyl acrylate, isopropyl acrylate, propyl methacrylate, n-butyl acrylate, sec-butyl acrylate, tert-butyl acrylate, tert-butyl methacrylate, sec-butyl methacrylate, n-butyl methacrylate, tert-butylcyclohexyl acrylate, tert-butylcyclohexyl methacrylate, cyclohexyl acrylate, 2-ethylhexyl acrylate, 2-ethylhexyl methacrylate and lauryl acrylate. It is also possible to use the esters of ethacrylic acid which are derived from monohydric alcohols of 1 to 12 carbon atoms. It is preferable to use from this group of monomers acrylic esters and/or methacrylic esters of monohydric alcohols containing from 3 to 6 carbon atoms. Very particular preference is given to the use of tert-butyl acrylate, n-butyl acrylate and isobutyl acrylate or mixtures thereof in an amount from 85 to 98% by weight, based on the monomer mixture grafted onto polymer (A). The monomers of group (1) are generally used in an amount from 70 to 100% by weight, based on the monomers to be grafted on. If the modification is only small, the amount of monomers of group (1) is from 92.5 to 100% by weight.

Suitable monomers of group (2) are monoethylenically unsaturated carboxylic acids of 3 to 6 carbon atoms and/or anhydrides thereof. This group of monomers corresponds to the monomers of group (b) of polymer (A). Specific examples thereof are acrylic acid, methacrylic acid, ethacrylic acid, fumaric acid, the anhydrides of the carboxylic acids mentioned, and maleic anhydride. This group of monomers is optionally used in the preparation of graft polymers and is present in an amount from 0 to 15% by weight in the monomer mixture grafted onto polymer (A). In this group of monomers, preference is given to acrylic acid, methacrylic acid, maleic anhydride or itaconic anhydride in an amount from 0 to 7.5% by weight, based on the monomers.

Suitable monomers of group (3) of the monomers which can be grafted onto polymer (A) are acrylic monoesters and/or methacrylic monoesters of not less than 2-hydric alcohols. These include for example hydroxyethyl acrylate, hydroxyethyl methacrylate, hydroxypropyl acrylate, hydroxypropyl methacrylate, hydroxybutyl acrylate and hydroxybutyl methacrylate. This group of monomers is optionally present in the monomer mixture up to 10% by weight.

The polymer (A) may be further modified by grafting with monomers of group (4). These monomers include aromatic monovinyl compounds which can be present in the monomer mixture in an amount of up to 15% by weight, preferably from 1 to 7.5% by weight. These monomers are identical to the monomers of group (a) of polymer (A). Of this group of monomers, styrene is preferred.

A further modification is possible when the mixture of monomers grafted onto polymer (A) optionally contain as monomers of group (5) up to 7.5% by weight of acrylamide and/or methacrylamide. The sum of the weight percentages of the monomers of groups (1) to (5) is always 100. The monomers (1) to (5) are used in an amount from 97.5 to 50% by weight, preferably from 90 to 75, based on the mixture of polymer (A) and monomers (1) to (5), to prepare the graft polymers.

The graft polymerization generally takes place at from 50° to 150° C., preferably at from 60° to 120° C., in the presence of polymerization initiators which are used, in general, in an amount from 0.01 to 6, preferably from 0.1 to 4% by weight, based on the weight of polymers (A) and the monomer mixture. The graft polymerization can be carried out under atmospheric pressure, under superatmospheric pressure or under reduced pressure.

Suitable polymerization initiators are for example azobisisobutyronitrile, acyl peroxides, such as benzoyl peroxide, dilauroyl peroxide, didecanoyl peroxide, isononanoyl peroxide, alkyl peresters, such as tert-butyl perpivalate, tert-butyl per-2-ethylhexanoate, tert-butyl permaleate, tert-butyl perisononanoate, tert-butyl perbenzoate, dialkyl peroxides, such as dicumyl peroxide, tert-butylcumyl peroxide, di-tert-butyl peroxide, and peroxodicarbonates, such as dimyristyl peroxodicarbonate, dicetyl peroxodicarbonate, bis(4-tert-butylcyclohexyl) peroxodicarbonate, dicyclohexyl peroxodicarbonate, di-2-ethylhexyl peroxodicarbonate, hydroperoxides, such as cumene hydroperoxide and tert-butyl hydroperoxide, and polymerization initiators such as 3,4-dimethyl-3,4-diphenylhexane and 2,3-dimethyl-2,3-diphenylbutane. Preference is given to using alkyl peresters, in particular tert-butyl perpivalate, tert-butyl per-2-ethylhexanoate and tert-butyl perisononanoate, in amounts from 2 to 4% by weight, based on the weight of polymer (A) and the monomer mixture.

The polymerization initiator can also be added to the reaction mixture in the form of a solution, for example in liquid aliphatic and aromatic hydrocarbons together with the monomers or dissolved in the monomers themselves. In some cases it is of advantage in the graft polymerization to introduce initially only a portion of polymer (A), for example an amount from 10 to 60% by weight, in the form of a solution or dispersion in an aliphatic or aromatic hydrocarbon and to dissolve the remaining amount of polymer (A) in the particular monomer mixture used and to add this solution to the reaction mixture preferably at the rate of the graft polymerization. The polymer (A) which is used as graft base is preferably used in amounts from 5 to 30% by weight, based on the weight of polymer (A) and the particular monomer mixture used.

As stated above, in the preferred embodiment the protective colloids are prepared in the aliphatic and/or aromatic hydrocarbon which is also used as inert hydrophobic solvent in the subsequent reverse suspension polymerization, thereby avoiding the preparation of different solvent mixtures in production. Nonetheless, however, still other solvents are suitable for preparing the graft polymers (A), for example ketones, such as acetone or methyl ethyl ketone, esters, such as ethyl acetate, alcohols, such as methanol, ethanol or isopropanol, alone or mixed with aromatic hydrocarbons, for example toluene, benzene, o-, m- or p-xylene and/or mixed with aliphatic hydrocarbons, for example hexane, heptane, octane or cyclohexane. The monomer mixtures can be introduced into the graft polymerization either in pure form or dissolved in a solvent or solvent mixture. During the graft polymerization the solvent can also be added to the reaction mixture separately from the monomers. It is also possible to add a portion of the solvent during the graft polymerization and the remainder after the reaction. After the graft polymerization the graft polymers obtained therein, i.e. the protective colloids to be used in the reverse suspension polymerization, can be isolated if desired in pure form or be used in the reverse suspension polymerization in the form in which they are obtained in the polymerization. Preferably, the dispersions obtainable in the graft polymerization are used directly without isolation of the graft polymer. The K value of the graft copolymers to be used according to the invention as protective colloids is from 25 to 100, preferably from 34 to 65. The protective colloids are used in the reverse suspension polymerization in an amount from 0.01 to 3, preferably from 0.2 to 1.1, % by weight, based on the monomers used.

The proportion of inert hydrophobic liquid in the water-in-oil suspension is from 22 to 91% by weight, preferably from 35 to 73% by weight. The reverse suspension polymerization gives bead polymers which, on azeotropic removal of the water and on removal of the oil phase, are obtained as dry products. The diameter of the polymer beads ranges from 0.01 to 1.6 mm and is preferably within the range from 0.05 to 0.8 mm. The advantage of the protective colloids to be used according to the invention is that it is possible to produce products having a narrower particle size distribution and that polymers having a substantially lower fines content are obtained. In addition it is possible to use a single protective colloid to produce a large number of polymers of uniform particle size without having to develop a new, special-purpose protective colloid for each change in the monomer composition, so that the protective colloids described herein are more widely useable than those hitherto used for reverse suspension polymerizations. By using the protective colloids described the formation of polymer deposits on kettle walls and stirrer shafts is virtually avoided.

The high molecular weight homopolymers and copolymers (K values from 170 to 300) obtained in the reverse suspension polymerization are used for example as flocculants in wastewater treatment plants and as sludge conditioners in the treatment of raw coal and in paper-making. Crosslinked copolymers based on acrylic acid, methacrylic acid and amides thereof are used as thickeners (for example in textile pigment printing) or as water absorbents in hygiene articles. Homopolymers and copolymers obtainable by the process of reverse suspension polymerization with K values from 60 to 150 are used for example for enhancing the dry strength of paper. Low-molecular weight polymers whose K values are up to 60, preferably from 10 to 40, are dispersants which are used for example for dispersing pigments for paper-coating compositions.

The percentages in the Examples are by weight. The molecular weights of the graft polymers were determined by vapor pressure osmometry in acetone and have the units g/mol. The molecular weights reported for the polymers (A) are always based on the number average. The softening points of polymers A) were determined on a Kofler hot-bench. The hydrogenation iodine numbers were determined in accordance with German Standard Specification DIN 53,241 and have units of g of iodine/100 g of polymer. The K values of the graft copolymers used as protective colloids and of the polymers prepared by the process of reverse suspension polymerization were determined in accordance with H. Fikentscher, Cellulose Chemie, 13 (1932), 48–64, 71–74. The K values of the protective colloids were measured in 1% strength solution in tetrahydrofuran at 25° C., while the K values of the polymers obtained by reverse suspension polymerization were determined at 25° C. in 5% strength sodium chloride solution at a polymer concentration of 0.1%.

The following polymers (A) were prepared as graft base:

Polymer A 1

A monomer mixture of 83% of styrene and 17% of methacrylic acid is polymerized by continuous bulk polymerization at from 225° to 235° C. under a pressure of 27 bar giving a copolymer having a molecular weight of 3,420, an acid number of 110 mg of KOH/g, a hydrogenation iodine number of 9 and a softening point of 144° C.

Polymer A 2

A monomer mixture of 76% of styrene and 24% of methacrylic acid is continuously polymerized in bulk at from 238° to 240° C. under a pressure from 26 to 28 bar giving a copolymer having the following parameters: molecular weight 4,630, acid number: 147 mg of KOH/g, hydrogenation iodine number 10 and softening point 150° C.

Polymer A 3

A monomer mixture of 83% of styrene and 17% of methacrylic acid is continuously polymerized at from 249° to 251° C. under a pressure of 24 bar to give a copolymer which has a molecular weight of 1,870, an acid number of 104 mg of KOH/g, a hydrogenation iodine number of 14 g/100 g of polymer and a softening point of 138° C.

Polymer A 4

A monomer mixture of 92% of styrene and 8% of acrylic acid is continuously polymerized at from 252° to 255° C. under a pressure of 24 bar to give a copolymer which has a molecular weight of 1,190, an acid number of 63 mg of KOH/g of polymer and a hydrogenation iodine number of 20 g of iodine/100 g of polymer. Preparation of graft polymers for use as protective colloids The graft polymerization was carried out in a customary polymerization apparatus comprising a reaction vessel equipped with a reflux condenser, a thermometer, heating and cooling means, a stirrer, add vessels and with means for working under an inert gas blanket.

Protective colloid A

The polymerization apparatus described above is charged with a mixture of 600 g of polymer A 1, 500 g of cyclohexane, 720 g of tert-butyl acrylate and 4.7 g of tert-butyl per-2-ethylhexanoate, which is brought to the boil under reflux. From the start of refluxing a solution of 1,440 g of tert-butyl acrylate, 240 g of methacrylic acid and 1,250 g of cyclohexane and, separately therefrom, a solution of 90 g of tert-butyl per-2-ethylhexanoate in 500 g of cyclohexane are added simultaneously in the course of 3 and 3.5 hours respectively. From the completion of monomer and initiator addition the reaction mixture is refluxed at the boil for a further 2 hours and then diluted with cyclohexane. A protective colloid dispersion is obtained having a polymer content of 30%. The graft copolymer has a K value of 36.

Protective colloid B

The polymerization apparatus described above is charged with a mixture of 1,700 g of polymer A 3, 532 g of maleic anhydride, 1,600 g of cyclohexane, 2,470 g of tert-butyl acrylate and 65 g of tert-butyl perpivalate, which is brought to the boil under reflux. From the start of refluxing a solution of 4,730 g of tert-butyl acrylate and 568 g of styrene in 1,766 g of cyclohexane and a solution of 260 g of tert-butyl perpivalate in 833 g of cyclohexane are added simultaneously in the coarse of 2 hours. After the monomers and the polymerization initiator have been added, the reaction mixture is stirred under reflux at the boil for a further 2 hours and then diluted with cyclohexane. A protective colloid dispersion is obtained having a polymer content of 40%. The graft copolymer has a K value of 32.

Protective colloid C

The polymerization apparatus described above is charged with a mixture of 560 g of polymer A 1, 516 g of n-butyl acrylate, 3.2 g of tert-butyl perpivalate and 353 g of cyclohexane, which is brought to the boil under reflux. Right from the start of refluxing a solution of 894 g of n-butyl acrylate in 530 g of cyclohexane and a solution of 61.5 g of tert-butyl perpivalate in 176 g of cyclohexane are added simultaneously in the course of 3 hours. After the initiator and the monomers have been added, the reaction mixture is subsequently stirred at the boil for 2 hours and then diluted with cyclohexane. A slightly cloudy protective colloid solution is obtained having a polymer content of 20%. The graft copolymer has a K value of 35.

Protective colloid D

The procedure for preparing protective colloid C is repeated, except that the n-butyl acrylate is replaced by tert-butyl acrylate, affording a protective colloid dispersion having a polymer content of 20%. The K value of the graft copolymer is 37.

Protective colloid E

The polymerization apparatus described above is charged with a mixture of 850 g of polymer A 1, 266 g of maleic anhydride, 1,200 g of tert-butyl acrylate and 7.9 g of tert-butyl perpivalate in 800 g of cyclohexane which is brought to the boil under reflux. A solution of 2,400 g tert-butyl acrylate and 284 g of styrene in 850 g of cyclohexane and a solution of 150.1 g of tert-butyl perpivalate in 430 g of cyclohexane are added simultaneously to the reaction mixture in the course of 3 hours. The reaction mixture is stirred at the boil for a further 2 hours after completion of the monomer and initiator addition and is then diluted with 9,590 g of cyclohexane. The protective colloid dispersion has a solids content of 30%. The K value of the graft polymer is 42.

Protective colloid F

The apparatus described above is charged with a solution of 175 g of polymer A 4, 98.1 g of maleic anhydride, 52 g of styrene, 925 g of 2-ethylhexyl acrylate and 3 g of tert-butyl per-2-ethylhexanoate in 400 g of toluene, which is brought to the boil and stirred for 30 minutes at the reflux temperature. A solution of 160 g of tert-butyl per-2-ethylhexanoate in a mixture of 200 g of toluene and 100 g of acetone and a solution of 1,845 g of 2-ethylhexyl acrylate, 175 g of polymer A 4, 98.1 g of maleic anhydride and 52 g of styrene of 200 g of acetone are then added simultaneously in the course of one hour, and afterwards the reaction mixture is polymerized for a further 2 hours. By adding a mixture of toluene and acetone in a weight ratio of 2:1 to the reaction mixture the solids content of the dispersion is adjusted to 66.8%. The graft copolymer has a K value of 46.2.

Protective colloid G

The procedure for preparing protective colloid E is repeated, except that the 2-ethylhexyl acrylate is replaced by the same amount of n-butyl acrylate and the graft copolymer content is adjusted to 75.2% by adding a mixture of toluene and acetone in a weight ratio of 2:1. The graft polymer has a K value of 42.9.

Protective colloid H

The procedure for preparing protective colloid F is repeated, except that the 2-ethylhexyl acrylate used there is replaced by isobutyl acrylate and instead of toluene and a mixture of toluene and acetone only cyclohexane is used. After the graft polymerization has ended, the reaction mixture is diluted to a solids content of 40.5% by weight by addition of cyclohexane. The graft copolymer has a K value of 40.1.

Protective colloid I (as described in U.S. Pat. No. 4,264,613)

As per Example 1 of said patent, protective colloid A is prepared from dicyclopentadiene, maleic anhydride and styrene.

Reverse suspension polymerization

The protective colloids A to I used in the Examples are used in the form of the dispersions or solutions, the amounts thereof specified always being based on the solids contents.

EXAMPLE 1

The polymerization apparatus used comprises a 2 1 flask equipped with impeller stirrer, reflux condenser, water separator, thermometer and nitrogen inlet tube. It is charged with 800 g of cyclohexane, 1.9 g of protective colloid B are added, and the mixture is heated to 55° C. A solution of 400 g of a 60% strength aqueous solution of diallyldimethylammonium chloride in which, in addition, 3 g of 2,2'-azobis(2-amidinopropane) dihydrochloride has been dissolved is then added in the course of 1 hour. During the addition of the aqueous solution to the charge, the mixture is stirred to form a suspension. The reaction mixture is then heated to 55° C. and stirred at that temperature for 16 hours. The water is then removed azeotropically, the contents are cooled down to room temperature, and the polymer beads are filtered off and then dried under reduced pressure. In this way a very free-flowing, low-fines bead polymer having a K value 99 is obtained. The polymerization apparatus was free of wall and stirrer deposits. The particle size distribution is given in Table 1. The water-soluble polymer can be used inter alia as a flocculant in papermaking.

EXAMPLE 2

The polymerization apparatus described in Example 1 is charged with 800 g of cyclohexane and 2 g of protective colloid E. The mixture is stirred with 400 g of a 62% strength aqueous diallyldimethylammonium chloride solution in which 5 g of potassium peroxodisulfate and 1 g of triallylmethylammonium chloride has been dissolved to produce a water-in-oil suspension. The suspension is polymerized at 70° C. for 12 hours. The water is then removed by azeotropic distillation, and the crosslinked bead product is then filtered off and dried under reduced pressure to give a free-flowing, water-swellable polymer having a particle size of from 0.07 to 0.75 mm. The polymerization apparatus and the stirrer were free of deposits. The insoluble, water-swellable polymer can be used for producing liquid-absorbent products.

EXAMPLE 3

In the polymerization apparatus described in Example 1, a suspension is prepared by the method of Example 1 by adding to 800 g of cyclohexane and 2 g of protective colloid A 400 g of a 60% strength aqueous diallylpyrrolidinium bromide solution and 100 g of a 50% strength aqueous acrylamide solution containing 3 g of dissolved 2,2'-azobis(2-amidinopropane) dihydrochloride. The reaction mixture is polymerized at 60° C. for 10 hours. The water is then removed azeotropically, and the product is filtered off and dried under reduced pressure. In this way a free-flowing polymer in bead form having a particle size from 0.1 to 0.5 mm is obtained. The polymer is virtually dust-free. There are no deposits in the polymerization apparatus. The copolymer has a K value of 85 and is suitable inter alia for use as a dispersant.

EXAMPLE 4

A 4-liter capacity kettle equipped with impeller stirrer, reflux condenser, add vessel and means for working under nitrogen is charged with 1.6 l of cyclohexane and 2.8 g of protective colloid B. The contents are then heated to 50° C. and the pressure reduced to such an extent that the mixture starts to boil under reflux. A monomer solution is then prepared by dissolving 223 g of acrylic acid and 203 g of 50% strength sodium hydroxide solution in 250 g of demineralized water and adding 280 mg of N,N'-methylenebisacrylamide, followed by 0.6 ml of a 1% strength aqueous solution of nitrilotrisodium acetate and 1.12 g of potassium peroxodisulfate. The mixture is then freed from dissolved oxygen by passing in nitrogen and subsequently added dropwise to the charge in the course of one hour. After a postpolymerization time of 1 hour at 50° C. the water present in the polymer particles is removed by azeotropic distillation. The polymer beads formed are filtered from the cyclohexane and dried at 60° C. overnight in a vacuum drying cabinet. The polymer beads have an average diameter of 0.25 mm. The polymerization apparatus has no wall or stirrer deposits. The insoluble, strongly water-absorbent polymer is suitable inter alia for producing liquid-absorbent hygiene articles.

EXAMPLE 5

A 1 liter round flask equipped with stirrer and reflux condenser is charged with 400 ml of cyclohexane and 0.81 g of protective colloid E. A monomer solution of 115 g of demineralized water, 50 g of N-vinylpyrrolidone, 0.5 g of ammonium formate and 0.54 g of 2,2'-azobis(2-amidinopropane) dihydrochloride is then emulsified in. The suspension is then heated to 45° C. and made to reflux at the boil by reducing the pressure. After polymerization at 45° C. for 10 hours the pressure is brought back to atmospheric. The water present in the polymer beads is then distilled azeotropically under a nitrogen blanket. Polymer beads having an average diameter of 0.15 mm are obtained. The water-soluble polymer has a K value of 130. The water-soluble product is suitable inter alia for use as a film former in hair cosmetics and as a coating agent for tablets.

General polymerization methods for Examples 6 to 24 and Comparisons 1 and 2.

The polymerization apparatus used is either a 5-liter capacity steel vessel or a 2-liter capacity 4-necked flask made of glass. Both the reactors are equipped with refluxer condenser, stirrer, nitrogen inlet and nitrogen outlet means, add vessels and connection for a vacuum pump. The steel vessel and the glass flask are charged with 1.6 l of cyclohexane and 800 ml of cyclohexane respectively and also with the particular quantities of protective colloid and water, if any, mentioned in the Examples. This initial charge is purged with nitrogen, the mixture is heated and the pressure is reduced until the solvent starts to boil under reflux at the particular polymerization temperature desired. The reaction mixture is stirred until the end of postpolymerization.

To polymerize the monomers, the monomer mixes mentioned in the Examples are mixed with the regulant and initiator quantities likewise mentioned therein, and this mixture is uninterruptedly added dropwise to the initial charge in the course of an hour. The completion of monomer and starter addition is followed by a 1-hour postpolymerization at a temperature corresponding to the polymerization temperature. In some cases this is followed by the addition of an aqueous hydroxylammonium sulfate solution or a solution of hydroxylammonium sulfate and sodium carbonate. The water present in the polymer particles is then distilled off azeotropically, and the polymer beads thus obtained are separated from the cyclohexane and dried at 50° C. under reduced pressure.

EXAMPLE 6

The reverse suspension polymerization is carried out in the steel vessel which is charged with 1.6 l of cyclohexane, 1.47 g of protective colloid B and 13 ml of water. The monomer add comprises a solution of 227 g of acrylic acid, 2.7 ml of a 1% strength aqueous solution of diethylenetriaminepentasodium acetate, 1.5 g of formic acid and 1.7 g of potassium persulfate in 350 ml of water. The polymerization is carried out at 70° C. to give a polyacrylic acid in bead form. The K value of the sodium salt is 119. This water-soluble product is suitable inter alia for use as a sizing agent for textile fibers and as a dispersant.

EXAMPLE 7

The steel kettle is charged with 1.6 l of cyclohexane, 2.9 g of protective colloid D and 13 ml of water. The add comprises a mixture of 322 ml of water, 227 g of acrylic acid, 125 g of 50% strength aqueous sodium hydroxide solution, 0.03 g of diethylenetriaminepentasodium acetate, 0.2 mol % of sodium persulfate and, based on the monomer, 3 mol % of formic acid. The polymerization is carried out at 70° C. and gives a polymer in bead form which is nondusting and has a K value of 84. This water-soluble product is suitable inter alia for use as a sizing agent for textile fibers and as a dispersant.

EXAMPLE 8

The steel kettle is charged with 1.6 l of cyclohexane, 2.9 g of protective colloid B and 13 ml of water. A monomer solution comprising 227 g of acrylic acid, 76 g of sodium hydroxide, 26 mg of diethylenetriaminepentasodium acetate, 4.7 g of formic acid and 1.7 g of ammonium peroxodisulfate in 400 ml of water is added dropwise at 70° C. The result is a bead copolymer of acrylic acid and sodium acrylate which has a K value of 90. The particle size distribution is given in Table 1. This water-soluble product is suitable inter alia for use as a sizing agent for textile fibers and as a dispersant.

EXAMPLE 9

The steel kettle is initially charged with 2.8 g of protective colloid B and 20 ml of water, as well as the cyclohexane. The add comprises a solution of 377 g of acrylamide and also, based on acrylamide, 650 ppm of formic acid, 360 ppm of diethylenetriaminepentasodium acetate and 0.05 mol % of 4,4'-azobis(4-cyanopentanoic acid) in 420 ml of water. The polymerization is carried out at 50° C., and the reaction mixture is then treated with 60 mg of hydroxyl ammonium sulfate and 2 g of sodium carbonate dissolved in 35 ml of water, and dehydrated azeotropically. The result is a low-fines polymer in bead form having a K value of 176. This polyacrylamide is suitable for example for use as a flocculant for water treatment sludge.

EXAMPLE 10

The polymerization is carried out in the steel kettle which is charged initially with 2.7 g of protective colloid, as well as the cyclohexane. This initial charge is heated to 55° C., and at that temperature the monomer solution and 110 mg of potassium persulfate are added simultaneously. The monomer solution comprises 230 g of water, 376 g of 50% strength aqueous acrylamide solution, 45 g of 97% strength aqueous acrylic acid solution, 70 mg of diethylenetriaminepentasodium acetate, 30 mg of sodium hexametaphosphate, 0.3 g of triethylenetetramine and 46 g of 50% strength aqueous sodium hydroxide solution. 10% strength aqueous ammonia solution is added to set a pH of 10, and the whole solution is added dropwise to the initial charge. After the polymerization has ended, 5 ml of 1% strength hydroxylammonium sulfate solution are added, and the mixture is dehydrated azeotropically. The copolymer in bead form has a K value of 238. The particle size distribution is given in Table 1. The water-soluble product can be used inter alia as a flocculant for water treatment sludge.

EXAMPLE 11

The polymerization is carried out in the steel kettle which is charged initially with 1.6 l of cyclohexane, 3 g of protective colloid D and 20 ml of water. The polymerization temperature is 65° C. The monomer add comprises a mixture of 175 g of water, 628 g of 50% strength aqueous acrylamide solution, 165 g of acrylic acid, 188 g of 50% strength aqueous sodium hydroxide solution and 0.3 g of diethylenetriaminepentasodium acetate. The monomer solution additionally contains, always based on the monomers, 0.1 mol % of formic acid and 0.2 mol % of 2,2'-azobis(2-amidinopropane) dihydrochloride dissolved in 42 ml of water. Based on the monomer quantity used, 250 ppm of hydroxylammonium sulfate and 0.8% of sodium carbonate are further added in the form of a 5% strength aqueous solution before the reaction mixture is dehydrated. The result is a copolymer in bead form having a K value of 245. This water-soluble product can be used inter alia as a flocculant for water treatment sludge.

EXAMPLE 12

The polymerization is carried out in the steel kettle at 65° C. The initial charge comprises 1.6 l of cyclohexane and 3 g of protective colloid B. The add comprises a mixture of 190 g of acrylamide, 83 g of acrylic acid, 47 g of sodium hydroxide, 0.15 g of diethylenetriaminepentasodium acetate, 0.21 g of formic acid dissolved in 420 ml of water and 90 ml of a 2% strength aqueous solution of 2,2'-azobis(N,N'-dimethyleneisobutyramidine) dihydrochloride. The postpolymerization is followed by addition of the amount of hydroxylammonium sulfate and sodium carbonate specified in Example 6. In this way a polymer is obtained in bead form having a K value of 223. This water-soluble product can be used inter alia as a flocculant for water treatment sludge.

EXAMPLE 13

The polymerization is carried out in the glass flask, which is charged with cyclohexane and, based on the amount of monomer used, 0.9% of protective colloid B. The monomer solution comprises a mixture of 59 g of water, 192 g of 50% strength aqueous acrylamide solution, 30 g of 80% strength aqueous solution of N,N-dimethylaminoethyl acrylate methochloride, 3.5 g of 1% strength aqueous solution of diethylenetriaminepentasodium acetate and 10.5 ml of formic acid. Shortly before the monomer solution is metered in, 12 ml of an aqueous 3% strength solution of 2,2'-azobis(2-amidinopropane) dihydrochloride are mixed into it. A reverse suspension polymerization is then carried out at 70° C. to give a polymer in bead form having a K value of 139. The polymer is suitable for enhancing the dry strength of paper.

EXAMPLE 14

The polymerization is carried out in the glass flask at 60° C. Cyclohexane and 1.1 g of protective colloid B are introduced initially, and a solution of 240 g of dimethylaminoethyl acrylate methochloride, 0.85 g of formic acid and 300 ppm of 2,2'-azobis(2-amidinopropane) dihydrochloride dissolved in 360 ml of water is polymerized to give polymer particles in ball form. This polymer has a K value of 109 and is suitable inter alia for enhancing the dry strength of paper.

EXAMPLE 15

The polymerization is carried out at 60° C. in the glass flask which is charged initially with the cyclohexane and 1.1 g of protective colloid B. The monomer solution comprises a mixture of 85 g of acrylamide, 46 g of N,N-dimethylaminoethyl acrylate hydrochloride, 200 ppm of diethylenetriaminepentasodium acetate, 1.2 mol % of formic acid, based on the monomers used, and 0.5 g of 2,2'-azobis(2-amidinopropane) dihydrochloride dissolved in 225 g of water. The copolymer in bead form has a K value of 186 and is suitable for use as a flocculant, as a retention aid and as a dewatering agent in papermaking and in the flocculation of water treatment sludge.

EXAMPLE 16

Copolymers of acrylamide and dimethylaminoethyl acrylate sulfate are obtained by the method described in Example 15 when the dimethylaminoethyl acrylate hydrochloride used therein is replaced by an equimolar amount of dimethylaminoethyl acrylate sulfate. The same polymerization conditions as in Example 15 produce a polymer in bead form having a K value of 173, which is suitable for use as a flocculant, as a retention aid and as a dewatering agent in papermaking and in the flocculation of water treatment sludge.

EXAMPLE 17

The polymerization is carried out in the glass flask at 60° C. The initial charge comprises 0.95 g of protective colloid B as well as 800 ml of cyclohexane. The polymerization temperature is 60° C. The add metered in comprises a mixture of the monomer solution described hereinafter and 8 ml of a 3% strength aqueous solution of 2,2'-azobis(2-amidinopropane) dihydrochloride. The monomer solution comprises a mixture of 110 g of water, 161.2 g of 50% strength aqueous acrylamide solution, 42 g of N,N-diethylaminoethyl acrylate, 28 g of concentrated hydrochloric acid and, based on the monomers used, 100 ppm of diethylenetriaminepentasodium acetate and 0.45 mol % of formic acid. The result obtained is a polymer in bead form having a K value of 212, which is suitable for use as a flocculant, as a retention aid and as a dewatering agent in papermaking and for the flocculation of water treatment sludge.

EXAMPLE 18

Example 17 is repeated, except that the basic monomer is replaced by an equimolar amount of diethylaminoethyl acrylate sulfate, affording a polymer in ball form which has a K value of 187 and is suitable for use as a flocculant, as a retention aid and as a dewatering agent in papermaking and for the flocculation of water treatment sludge.

EXAMPLE 19

The glass flask is charged with cyclohexane and 1.8 g of protective colloid F. The polymerization temperature is 60° C. The monomer solution comprises 245 g of water, 55.5 g of N,N-diethylaminoethyl acrylate methosulfate, 120 g of acrylamide, 85 mg of diethylenetriaminepentasodium acetate and 1.1 g of formic acid and also 20 ml of an aqueous solution of 0.1 mol % of 2,2'-azobis(2-amidinopropane) dihydrochloride, based on the monomers used. The result obtained is a polymer in bead form having a K value of 142 and the particle size distribution given in Table 1. This polymer is suitable inter alia for enhancing the dry strength of paper.

EXAMPLE 20

The glass apparatus is charged with 800 ml of cyclohexane and 1.5 g of protective colloid B. The add comprises a solution of 124.5 g each of N-vinylpyrrolidone and N,N-dimethylaminoethyl acrylate methochloride and also, based on the monomers, 120 ppm of diethylenetriaminepentasodium acetate, 1 mol % of formic acid and 0.5 mol % of 2,2'-azobis(2-amidinopropane) dihydrochloride in 175 ml of water. The polymerization is carried out at 60° C. to give a polymer having a K value of 109 and particles in bead form.

EXAMPLE 21

The initial charge described in Example 20 is admixed with a solution of 33.2 g of methacrylamide, 133 g of N,N-dimethylaminoethyl acrylate methochloride, 12 mg of diethylenetriaminepentasodium acetate and 0.3 g of 2,2'-azobis(2-amidinopropane) dihydrochloride in 183 ml of water. The polymerization temperature is 50° C. The polymer is obtained in the form of small, spherical particles and has a K value of 143.

EXAMPLE 22

The steel kettle is charged with 1.6 l of cyclohexane and, based on the monomer quantity used, 1% by weight of protective colloid B. The add comprises 800 g of a 50% strength aqueous solution of 336 g of sodium methacrylate, 64 g of methacrylic acid and also 6.5 g of formic acid. The monomer solution has been mixed with 84 ml of a 3% strength aqueous potassium peroxodisulfate solution. The polymerization at 70° C. gave polymer particles in ball form having a K value of 78.

EXAMPLE 23

The glass flask was charged with 800 ml of cyclohexane and 1.3 g of protective colloid D. The monomer add comprises 180 g of water, 60 g of acrylamide, 60 g of the sodium salt of 2-acrylamido-2-methylpropane sulfonic acid, 30 mg of diethylenetriaminepentasodium acetate, 3 g of formic acid and 0.5 g of potassium peroxodisulfate. The polymerization is carried out at 60° C. to give a polymer in bead form having a K value of 83.

EXAMPLE 24

The glass flask is charged with 800 ml of cyclohexane and 1.4 g of protective colloid B. The monomer solution comprises a mixture of 50 g of acrylic acid, 50 g of vinylphosphonic acid, 0.02 g of diethylenetriaminepentasodium acetate, 0.1 g of formic acid and 160 ml of water. The add is mixed with 25 ml of a 3% strength aqueous solution of 2,2'-azobis(2-amidinopropane) dihydrochloride and is polymerized at 60° C. by the general method specified above. The product is in bead form and has a K value of 60.

COMPARISON 1

Example 8 is repeated, except that 2.9 g of protective colloid I are used in place of the protective colloid B used there. The polymerization is carried out at 70° C. to give a product in bead form having a K value of 94. The particle size distribution is given in Table 1.

COMPARISON 2

Example 10 is repeated, except that the protective colloid G used therein is replaced by 2.7 g of protective colloid I, affording a product in bead form having a K value of 245 and the particle size distribution given in Table 1.

TABLE 1

| Polymerization according to | Particle size distributions Weight proportion [%] of particle size [μm] | | | | | | |
|---|---|---|---|---|---|---|---|
| | <63 | 63–125 | 125–250 | 250–500 | 500–710 | 710–1000 | >1000 |
| Example 1 | 0.2 | 2.48 | 34.92 | 59.70 | 1.62 | 0.61 | 0.47 |
| Example 8 | 0.1 | 1.4 | 30.1 | 65.4 | 2.9 | 0.1 | 0 |
| Example 10 | 0.4 | 3.0 | 26.9 | 69.2 | 0.4 | 0.1 | 0 |
| Example 11 | 0.22 | 1.26 | 7.73 | 57.63 | 29.88 | 2.79 | 0.49 |
| Comparison 1 | 0.4 | 2.1 | 27.7 | 57.9 | 9.4 | 0.8 | 1.7 |
| Comparison 2 | 0 | 0.2 | 3.8 | 19.5 | 38.4 | •34.2 | 3.9 |

TABLE 1-continued

| Polymerization according to | Particle size distributions Weight proportion [%] of particle size [μm] | | | | | | |
|---|---|---|---|---|---|---|---|
| | <63 | 63–125 | 125–250 | 250–500 | 500–710 | 710–1000 | >1000 |
| Example 19 | 0 | 0.4 | 3.7 | 45.1 | 43.6 | 6.7 | 0.5 |

EXAMPLE 25

A 2 l flask equipped with stirrer, thermometer, reflux condenser, inlet tube for inert gas and add vessels is charged initially with 1,280 ml of cyclohexane, 0.8 g of protective colloid H and 30 ml of water. The temperature is raised to 60° C. and the pressure is reduced to bring the contents of the flask to the boil under reflux. A previously prepared solution of 60 g of N-vinylformamide, 40 g of a 50% strength by weight aqueous acrylamide solution and 1.75 g of a 1% strength aqueous solution of the pentasodium salt of diethylenetriaminepentacetic acid, to which 0.4 g of 2,2'-azobis(2-amidinopropane) hydrochloride has been added and which has been brought to pH 8 with ammonia is added dropwise with stirring to the boiling initial charge in the course of one hour. After addition of the monomer and initiator solution the reaction mixture is postpolymerized for one hour. The water is then removed azeotropically, and the polymer in bead form is filtered off. This polymer is readily pourable and has a particle size from 0.1 to 0.3 mm. The K value of the copolymer is 149.

EXAMPLE 26

Example 25 is repeated, except that the initial charge comprises 1,000 ml of cyclohexane and 1.27 g of protective colloid B and the add used comprises a mixture of 258 g of deionized water, 260 g of N-vinylformamide, 1.82 g of formic acid and 1.3 g of 2,2'-azobis(2-amidinopropane) dihydrochloride. The solution of the add is brought to pH 8 by addition of ammonia. The polymerization is carried out as specified in Example 25 to give a readily pourable polymer in bead form of low fines content which has a K value of 172 and a particle size from 0.1 to 0.35 mm.

EXAMPLE 27

Example 26 is repeated, except that 1.34 g of protective colloid E are used and the polymerization is carried out on a monomer mixture comprising 25.2 g of deionized water, 200 g of a 50% strength by weight aqueous acrylamide solution, 0.56 g of formic acid, 3.55 g of 1% strength aqueous pentasodium salt solution of diethylenetriaminepentacetic acid and 25 g of N-vinylmethylimidazoline, brought to pH 3.5 with about 23 g of concentrated hydrochloric acid and admixed with 0.625 g of 2,2'-azobis(2-amidinopropane) hydrochloride. The monomer solution is then freed from oxygen by passing in nitrogen and is then added to the hot initial charge boiling under reduced pressure at 60° C. in the course of one hour. The postpolymerization takes one hour at 60° C. under reflux. The water is then distilled off azeotropically to leave a polymer in bead form, which is filtered off and dried. It has a K value of 169 and a particle size from 0.1 to 0.4 mm.

We claim:

1. An improved process for preparing a polymer in bead form from water-soluble, ethylenically unsaturated monomers by reverse suspension polymerization of a suspension of an aqueous solution of the monomers in an inert hydrophobic liquid in the presence of a polymerization initiator and of a protective colloid, the improvement comprising using as the protective colloid a graft polymer obtainable by grafting a polymer (A) containing
    (a) from 40 to 100% by weight of an aromatic monovinyl monomer,
    (b) from 0 to 60% by weight of a monoethylenically unsaturated carboxylic acid of 3 to 6 carbon atoms, maleic anhydride and/or itaconic anhydride and
    (c) from 0 to 20% by weight of other monoethylenically unsaturated monomers,
as copolymerized units with the proviso that the sum of the weight percentages (a) to (c) is always 100 and the polymer (A) has a molecular weight (number average) from 500 to 20,000 and a hydrogenation iodine number from 1.3 to 51 with a monomer mixture of
    (1) from 70 to 100% by weight of an acrylic ester and/or methacrylic ester of a monohydric alcohol containing from 1 to 20 carbon atoms,
    (2) from 0 to 15% by weight of a monoethylenically unsaturated carboxylic acid of 3 to 6 carbon atoms, maleic anhydride and/or itaconic anhydride,
    (3) from 0 to 10% by weight of an acrylic monoester and/or methacrylic monoester of a not less than dihydric alcohol,
    (4) from 0 to 15% by weight of an aromatic monovinyl monomer and
    (5) from 0 to 7.5% by weight of acrylamide and/or methacrylamide with the proviso that the sum of the weight percentages (1) to (5) is always 100, at up to 150° C. in an inert hydrophobic diluent in the presence of a polymerization initiator, the monomers being used in an amount from 97.5 to 50% by weight based on the mixture of polymer (A) and monomers.

2. A process as claimed in claim 1, wherein the protective colloid used is a graft polymer obtainable by grafting a polymer (A) containing
    (a) from 60 to 95% by weight of styrene and
    (b) from 5 to 40% by weight of acrylic acid, methacrylic acid or a mixture thereof as copolymerized units,
with a monomer mixture of
    (1) from 100 to 92.5% by weight of an acrylic ester and/or methacrylic ester of a monohydric alcohol containing from 3 to 6 carbon atoms and
    (2) from 0 to 7.5% by weight of acrylic acid, methacrylic acid, maleic anhydride or itaconic anhydride.

3. A process as claimed in claim 2, wherein the protective colloid used is a graft polymer obtainable by grafting polymer (A) with a monomer mixture of
    (1) from 85 to 98% by weight of tert-butyl acrylate, n-butyl acrylate, isobutyl acrylate or a mixture thereof,
    (2) from 1 to 7.5% by weight of acrylic acid, methacrylic acid, maleic anhydride or itaconic anhydride and
    (3) from 1 to 7.5% by weight of styrene.

4. A process as claimed in claim 1, wherein polymer (A) has a molecular weight (number average) from 1,000 to 10,000 and a hydrogenation iodine number from 2.5 to 25.4.

5. A process as claimed in claim 1, wherein the water-soluble, ethylenically unsaturated monomers which are polymerized comprise ethylenically unsaturated $C_3$–$C_6$-carboxylic acids, their alkali metal and/or ammonium salts, their amides, di-$C_1$–$C_3$-alkyldiallylammonium salts, protonated or quaternized di-$C_1$–$C_3$-alkylamino-$C_2$–$C_6$-(meth)acrylates, N-vinylpyrrolidone, N-vinylimidazole, N-vinylimidazoline and mixtures thereof.

* * * * *